(12) United States Patent
Lawson

(10) Patent No.: US 12,344,300 B1
(45) Date of Patent: Jul. 1, 2025

(54) LOW-PROFILE MOTORCYCLE DOLLY

(71) Applicant: Richard Quinn Lawson, Harrisburg, PA (US)

(72) Inventor: Richard Quinn Lawson, Harrisburg, PA (US)

( * ) Notice: Subject to any disclaimer, the term of this patent is extended or adjusted under 35 U.S.C. 154(b) by 0 days.

(21) Appl. No.: 18/933,916

(22) Filed: Oct. 31, 2024

(51) Int. Cl.
*B62B 3/02* (2006.01)
*B62B 5/00* (2006.01)

(52) U.S. Cl.
CPC .............. *B62B 5/0093* (2013.01); *B62B 3/02* (2013.01); *B62B 5/0089* (2013.01); *B62B 2202/90* (2013.01); *B62B 2206/02* (2013.01)

(58) Field of Classification Search
CPC   B62B 5/0093; B62B 3/06; B62B 3/04; B62B 3/02
See application file for complete search history.

(56) References Cited

U.S. PATENT DOCUMENTS

| | | | |
|---|---|---|---|
| 5,609,461 A * | 3/1997 | Lichtenberg | B60P 3/07 280/79.11 |
| 6,092,787 A * | 7/2000 | Nayman | B25H 1/0014 254/10 R |
| 6,095,746 A * | 8/2000 | Bergin | B62H 3/08 269/216 |
| 6,455,869 B1 * | 9/2002 | Cook | B62H 3/04 257/133 |
| 7,278,647 B1 | 10/2007 | Keenan et al. | |
| 7,325,816 B2 | 2/2008 | Johnson | |
| 8,052,159 B2 | 11/2011 | Chen | |
| 9,845,125 B1 * | 12/2017 | Liu | B62B 5/0083 |
| 10,981,588 B1 * | 4/2021 | Poudrier | B62B 3/02 |
| 2005/0284826 A1 * | 12/2005 | Johnson | B62B 5/0083 211/20 |
| 2018/0361903 A1 * | 12/2018 | Dees | B62B 5/0003 |
| 2020/0385042 A1 | 12/2020 | Verwys | |

* cited by examiner

*Primary Examiner* — Jason D Shanske
*Assistant Examiner* — James J Triggs

(57) ABSTRACT

A low-profile motorcycle dolly comprises a pair of parallel rods and at least one motorcycle wheel support assembly. The motorcycle wheel support assembly comprises a pair of caster subassemblies and a motorcycle wheel plate. Each caster subassembly attaches to one of the rods respectively. Each caster subassembly comprises a caster bracket. The caster bracket attaches to the respective rod and is provided with a pedal assembly. The motorcycle wheel plate is connected between the caster brackets of the pair of caster subassemblies. The pedal assembly comprises a pedal and a pedal shaft. Each caster subassembly further comprises a caster mounting plate pivotably mounted onto the caster bracket. The caster mounting plate comprises at least one caster wheel. The pedal is configured to be operated to rotate downward to push down the caster mounting plate, and upward to allow the caster mounting plate to be lifted.

14 Claims, 12 Drawing Sheets

LOW-PROFILE MOTORCYCLE DOLLY

FIELD OF THE INVENTION

The present invention relates generally to dollies for moving heavy objects. More specifically, the present invention is a dolly specifically designed for motorcycles. However, the present invention is not limited to this option, and it may further be adapted for different purposes.

BACKGROUND OF THE INVENTION

Motorcycles, like automobiles, are commonly stored in garages. Generally, the garage is of sufficient size to store both a motorcycle and an automobile. The motorcycle is normally maneuvered by the rider to a position alongside a sidewall of the garage so as to provide adequate room for the storage of the automobile. At times, it is difficult to maneuver a motorcycle to the desired location within the garage.

Therefore, it is an objective of the present invention to provide a low-profile motorcycle dolly that overcomes the problems set forth above.

SUMMARY OF THE INVENTION

The present invention discloses a low-profile motorcycle dolly comprising a pair of parallel rods each having a first end and a second end and at least one motorcycle wheel support assembly. The motorcycle wheel support assembly comprises a pair of caster subassemblies and a motorcycle wheel plate. Each caster subassembly attaches to one of the rods respectively. Each caster subassembly comprises a caster bracket that extends transversely to a respective rod. The caster bracket at a proximal end attaches to the respective rod and at a distal end is provided with a pedal assembly. The motorcycle wheel plate is connected between the caster brackets of the pair of caster subassemblies and configured to support a wheel of a motorcycle. The pedal assembly comprises a pedal and a pedal shaft. Each caster subassembly further comprises a caster mounting plate pivotably mounted onto the caster bracket. The caster mounting plate comprises at least one caster wheel. The pedal is configured to be operated by a foot of a user to rotate downward to push down the caster mounting plate such that the motorcycle wheel plate is raised away from a ground surface, and upward to allow the caster mounting plate to be lifted such that the motorcycle wheel plate is lowered down onto the ground surface.

In one embodiment, the at least one motorcycle wheel support assembly comprises a first motorcycle wheel support assembly attaching to the first end of the rods and a second motorcycle wheel support assembly attaching to the second end of the rods.

In one embodiment, each caster subassembly comprises a sleeve into which the rod can be inserted.

In one embodiment, the sleeve of the caster subassembly comprises a plurality of position adjustment holes, and each rod comprises a caster subassembly hole, and wherein sleeve of the caster subassembly further comprises a fastener that is inserted through one of the position adjustment holes and the caster subassembly hole.

In one embodiment, the caster bracket comprises two gusset plates that extend from the sleeve.

In one embodiment, the pedal comprises a cam portion adjacent to the pedal shaft.

In one embodiment, the caster mounting plate comprises a concave portion to accommodate the distal end of the caster bracket.

In one embodiment, the motorcycle wheel plate comprises an anti-skid pad at a bottom surface of the motorcycle wheel plate.

In one embodiment, the motorcycle wheel plate comprises at least one beveled edge.

In one embodiment, the present invention further comprises at least one kickstand assembly configured to support a kickstand of the motorcycle.

In one embodiment, the kickstand assembly comprises a sleeve, a kickstand bracket extending from the sleeve, and a kickstand pad attached to a distal end of the kickstand bracket.

In one embodiment, the sleeve of the kickstand assembly comprises at least one positioning hole, and the rod comprises a plurality of kickstand position adjustment holes, and wherein sleeve of the kickstand assembly further comprises at least one fastener configured to secure the kickstand bracket in a desired longitudinal position on the rod.

In one embodiment, the kickstand bracket further comprises at the distal end a plurality of transverse position adjustment holes, and the kickstand pad comprises at least one mounting hole, and wherein the kickstand pad further comprises at least one fastener configured to secure the kickstand pad in a desired transverse position relative to the rod.

In one embodiment, the kickstand pad further comprises at least one kickstand caster wheel.

BRIEF DESCRIPTION OF THE DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the present invention. That is, the dimensions of the components of the present invention, independently and in relation to each other can be different. It should be noted that the drawings are schematic and not necessarily drawn to scale. Some drawings are enlarged or reduced to improve drawing legibility.

DETAIL DESCRIPTIONS OF THE INVENTION

Figure 1:
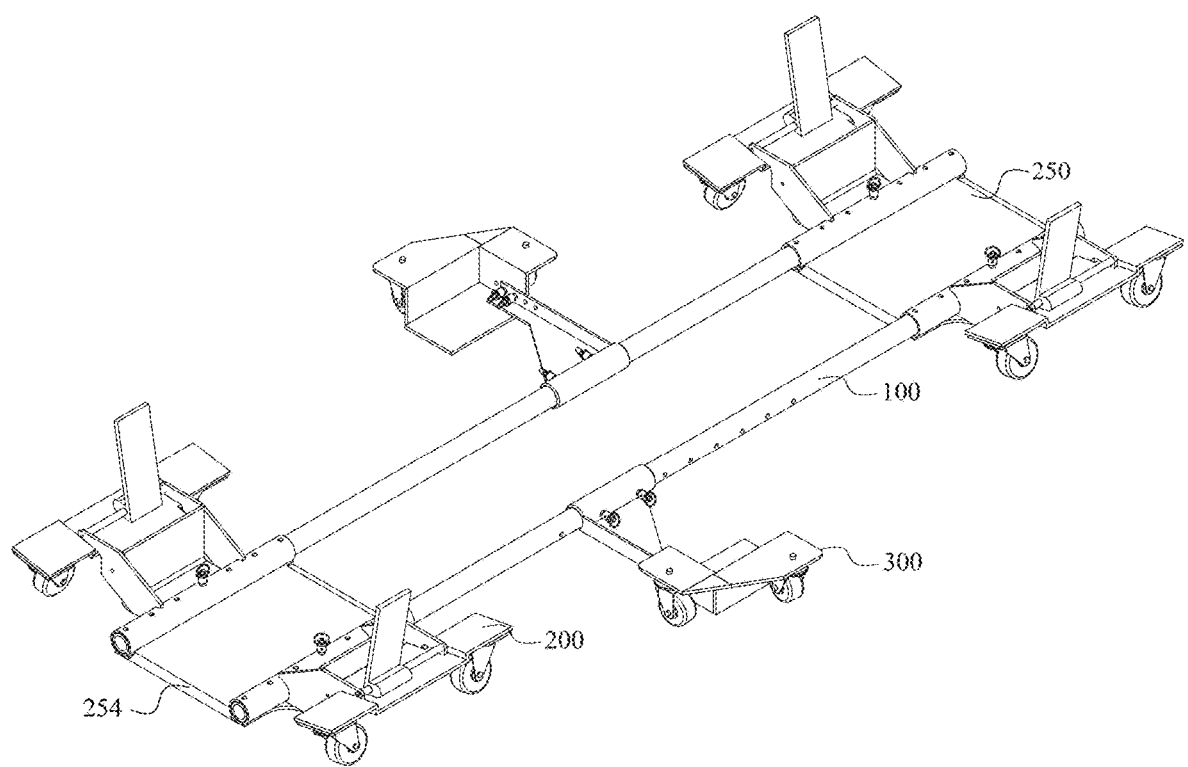
FIG. 1 depicts a top perspective view of the present invention.
Figure 2:
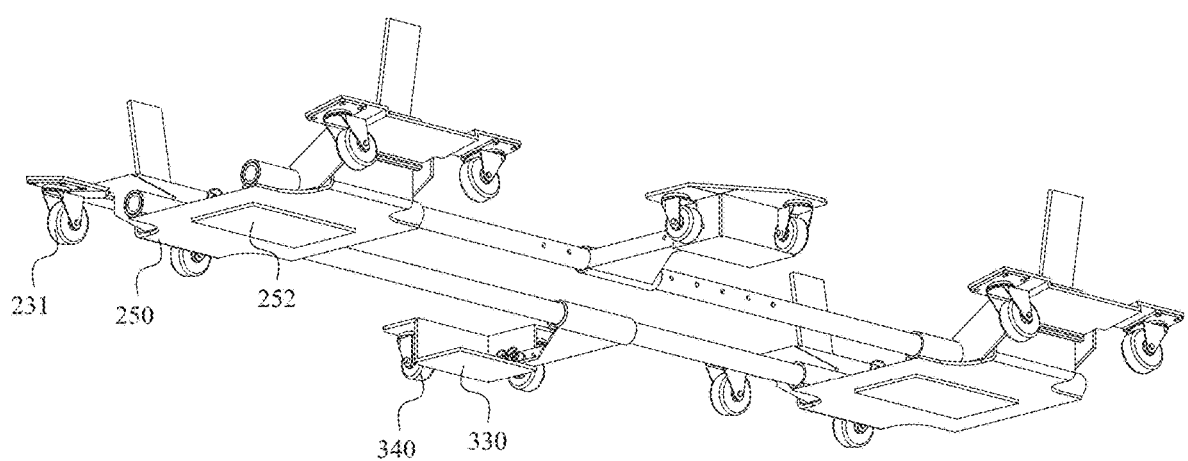
FIG. 2 depicts a bottom perspective view of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and is made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. When not explicitly defined herein, to the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate. As used herein, the term "proximate" refers to positions that are situated close/near in relationship to a structure. As used in the following description, the term "distal" refers to positions that are situated away from positions.

The present disclosure includes many aspects and features. Moreover, while many aspects and features relate to, and are described in the context of motorcycle dollies, embodiments of the present disclosure are not limited to use only in this context.

The present invention is a dolly that is specifically designed for motorcycles. It is an aim of the present invention to provide a motorcycle dolly that can lower down or raise the platform such that motorcycles can enter or exit the platform with ease in either direction.

Referring now to the figures of the present disclosure. The low-profile motorcycle dolly of the present invention comprises a pair of parallel rods 100 and at least one motorcycle wheel support assembly 200.

The pair of parallel rods 100 is configured to for the chassis of the low-profile motorcycle dolly of the present invention. It should be noted that the pair of parallel rods 100 can be of any shape, size, material, features, type or kind, orientation, location, quantity, components, and arrangements of components that would allow the present invention to fulfill the objectives and intents of the present invention. In the illustrated embodiment, each rod 100 has a round cross-section. However, the cross-section may have other shapes including but not limited to rectangular, triangular, hexagonal, polygonal, etc. Preferably, the rod 100 is a tubular rod with a hollow interior to reduce the overall weight of the present invention. The pair of parallel rods 100 is spaced apart from each other at a distance that is sufficient to accommodate the wheels of a motorcycle. Each Rod has a first end 101 and a second end 102.

The at least one motorcycle wheel support assembly 200 comprises a pair of caster subassemblies 210 and a motorcycle wheel plate 250. The pair of caster subassemblies 210 is configured to allow the motorcycle wheel plate 250 to raise up or lower down. In one embodiment, each of the pair of caster subassemblies attaches to one of the rods 100 respectively. The caster subassembly comprises a caster bracket 220 that extends transversely to a respective rod 100.

The caster bracket 220 at a proximal end 221 attaches to the respective rod and at a distal end 222 is provided with a pedal assembly 240. The motorcycle wheel plate 250 is connected between the caster brackets 220 of the pair of caster subassemblies 210 and configured to support a wheel of a motorcycle. In a preferred embodiment, the motorcycle wheel plate 250 comprises an anti-skid pad 252 at a bottom surface of the motorcycle wheel plate 250. When the motorcycle wheel plate 250 is lowered down, the anti-skid pad 252 will come into contact with a ground surface, preventing the present invention from accidentally moving around. In another preferred embodiment, the motorcycle wheel plate 250 comprises at least one beveled edge 254. The at least one beveled edge 254 will assist the motorcycle in riding on and off the motorcycle wheel plate 250. Preferably, the at least one beveled edge 254 comprises a front beveled edge and/or a rear beveled edge.

The pedal assembly 240 comprises a pedal 241 and a pedal shaft 243. The caster subassembly 210 further comprises a caster mounting plate 230 pivotably mounted onto the caster bracket 220. The caster mounting plate 230 comprises at least one caster wheel 231. Preferably, the caster mounting plate 230 comprises a concave portion 233 to accommodate the distal end 222 of the caster bracket 220. In the illustrated embodiment, the at least one caster wheel 231 comprises two caster wheels. However, in other embodiments, a different number of caster wheels is also contemplated and falls into the scope of the present invention. In one embodiment, the at least one caster wheel 231 comprises at least one swivel caster wheel.

Figure 3:
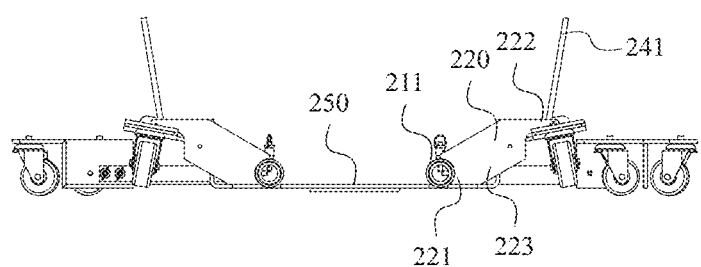
FIG. 3 depicts a front view of the present invention.
Figure 4:
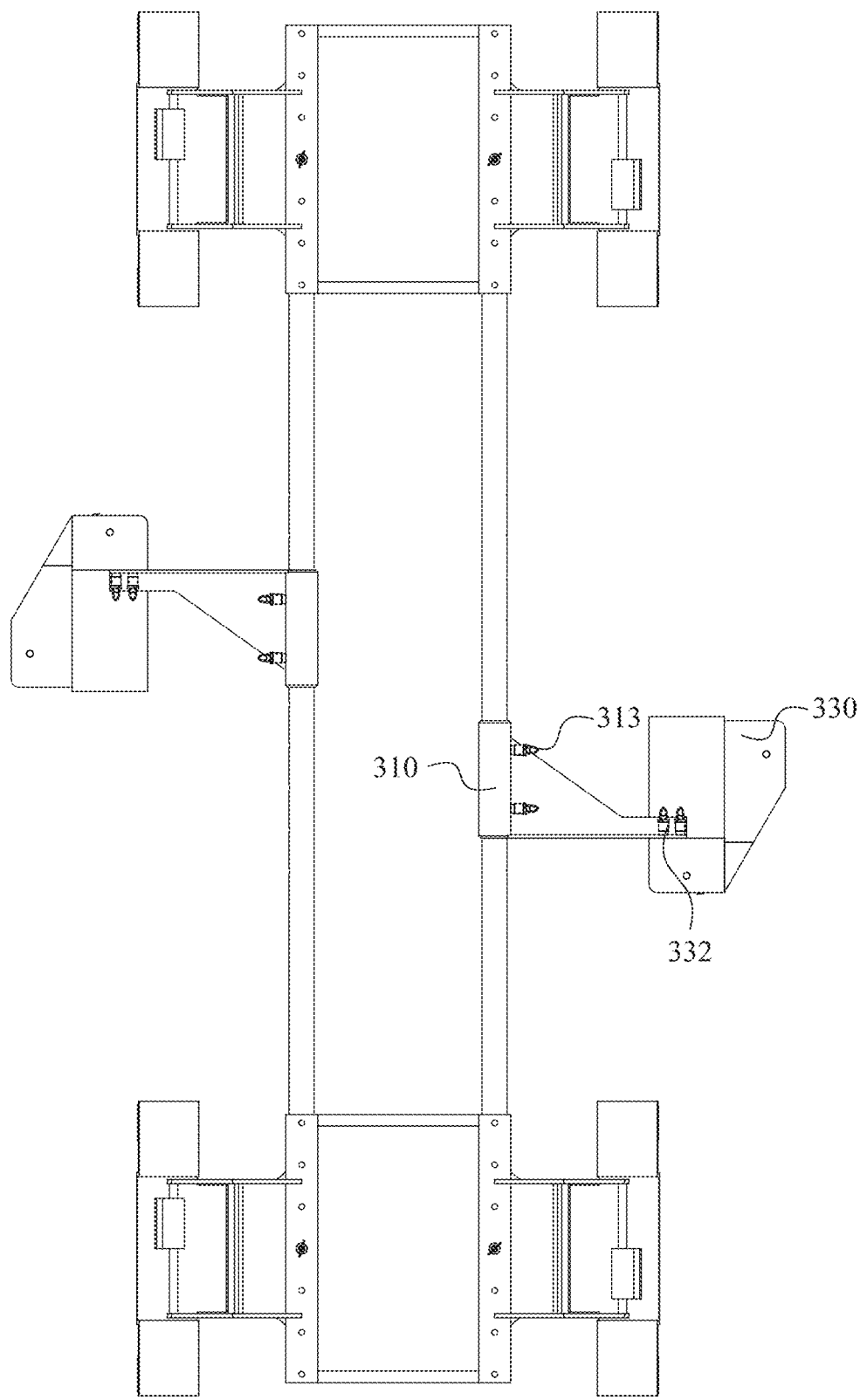
FIG. 4 depicts a top view of the present invention.
Figure 5:
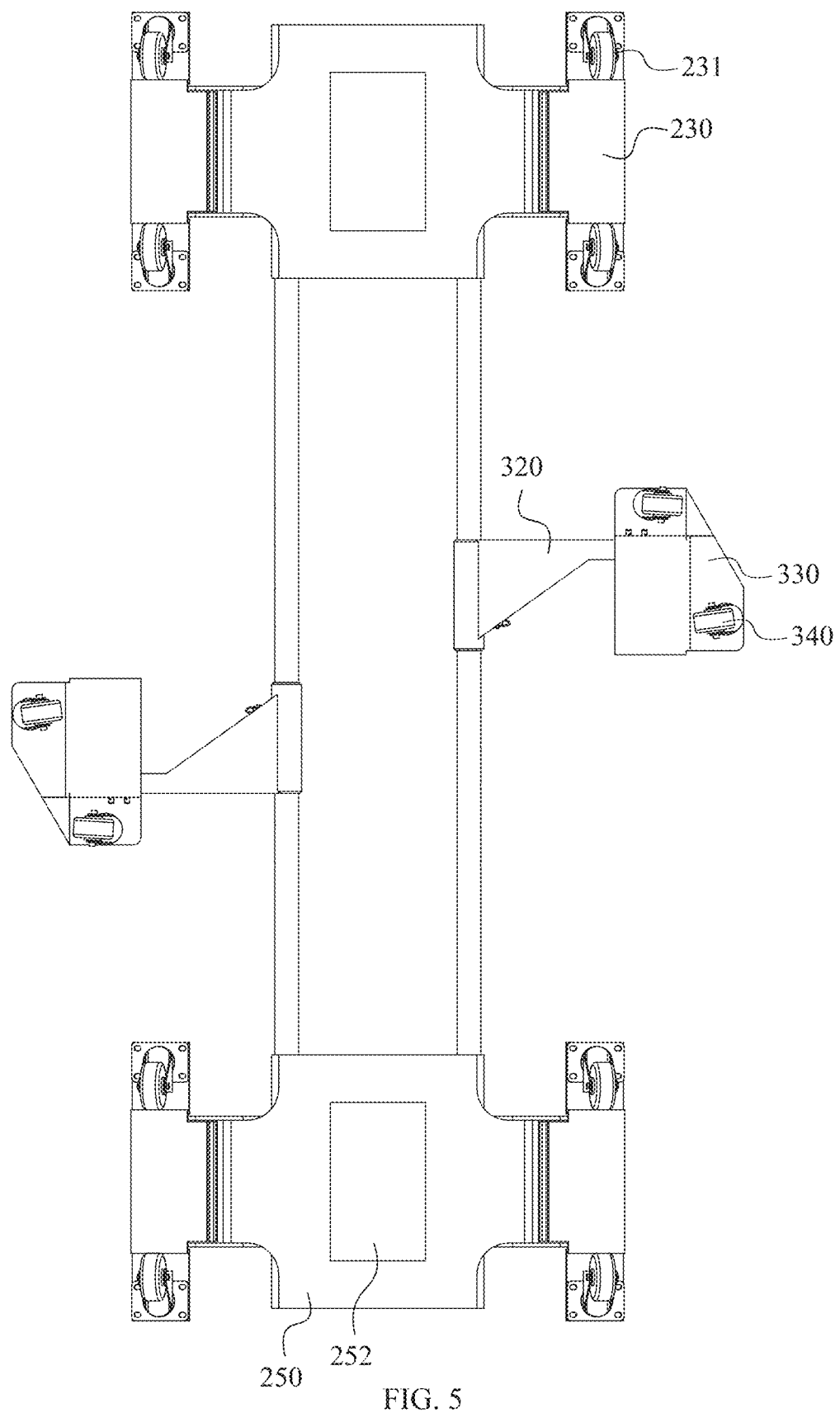
FIG. 5 depicts a bottom view of the present invention.
Figure 6:
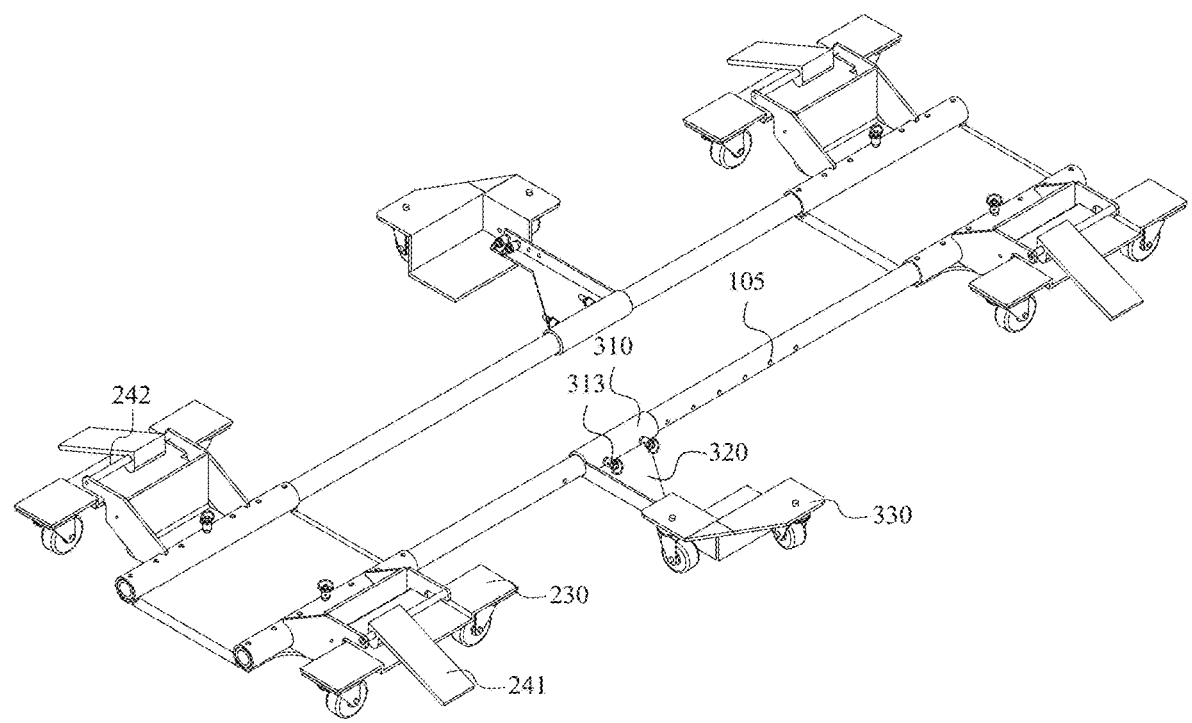
FIG. 6 depicts a perspective view of the present invention, wherein the pedal is lowered down.
Figure 7:
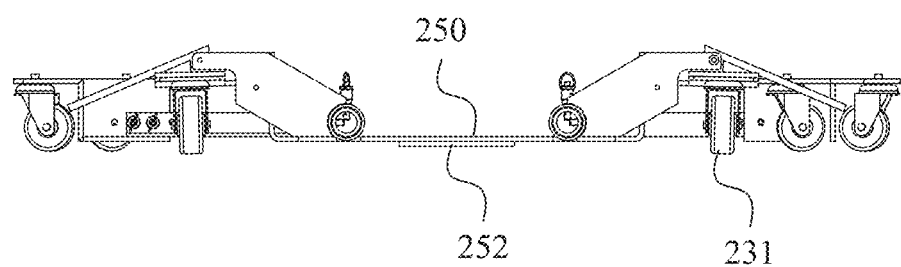
FIG. 7 depicts a front view of the present invention, wherein the pedal is lowered down.
Figure 8:
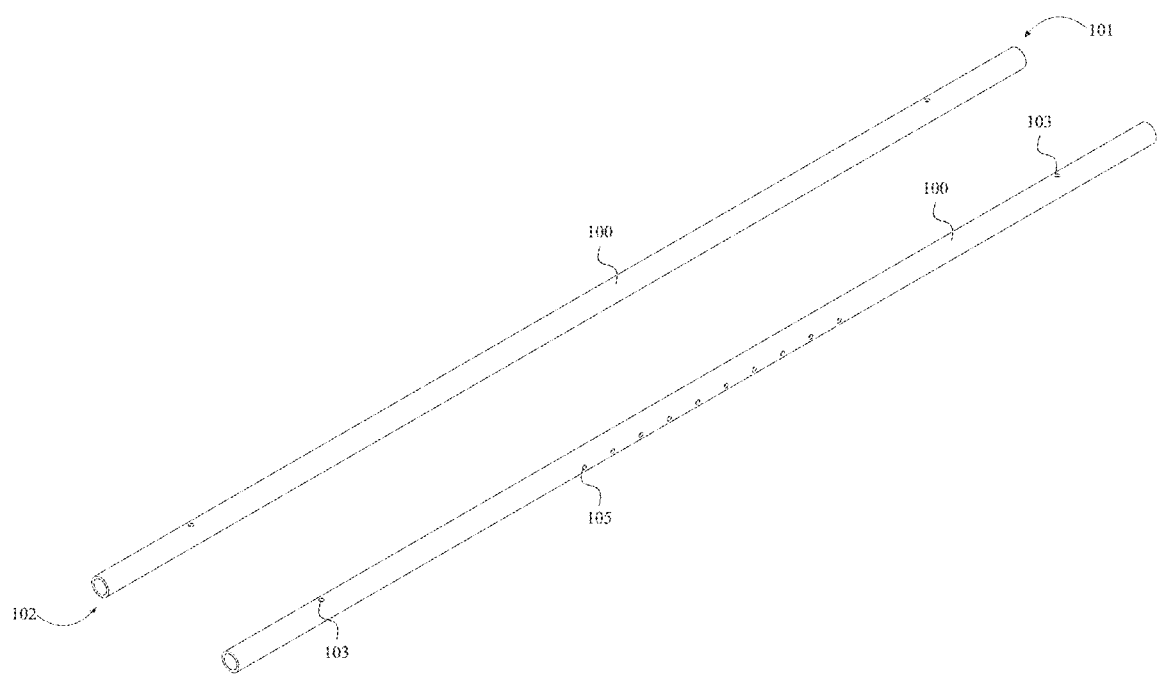
FIG. 8 depicts a perspective view of the rods of the present invention.
Figure 9:
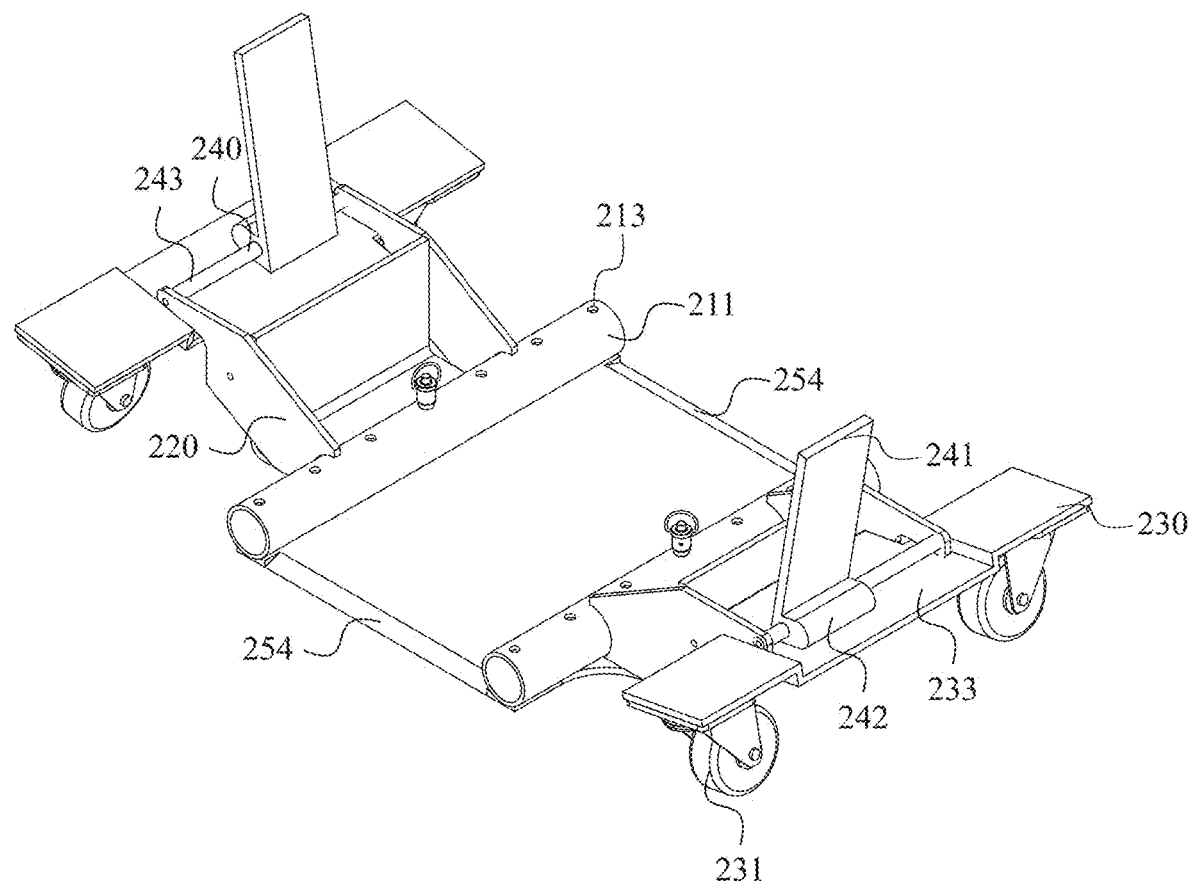
FIG. 9 depicts a perspective view of the motorcycle wheel support assembly of the present invention.
Figure 10:
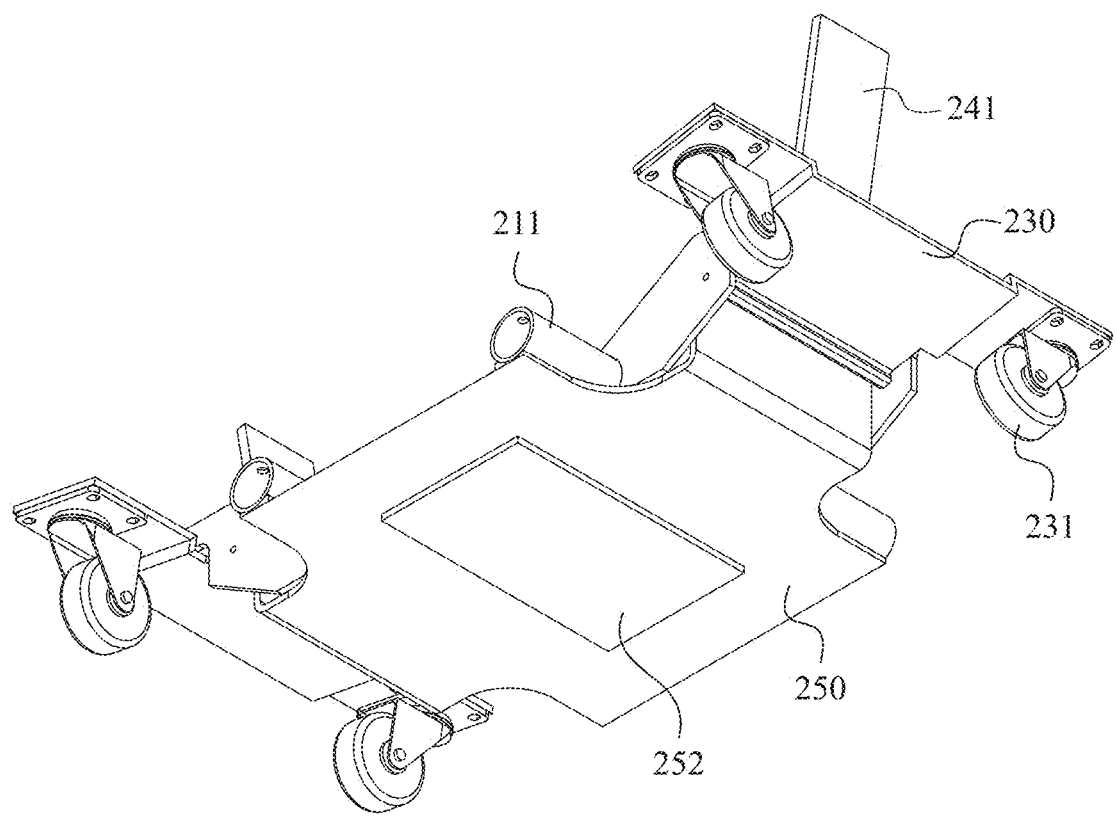
FIG. 10 depicts another perspective view of the motorcycle wheel support assembly of the present invention.
Figure 11:
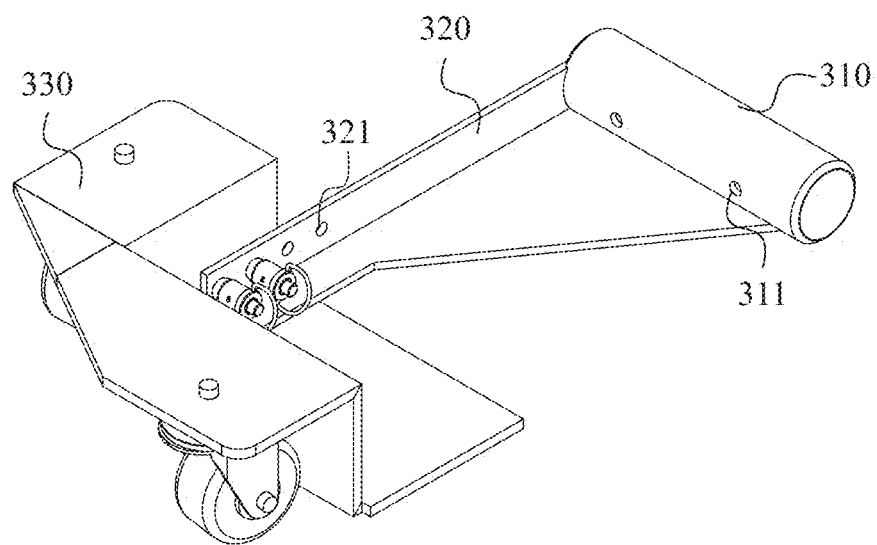
FIG. 11 depicts a perspective view of the kickstand assembly of the present invention.
Figure 12:
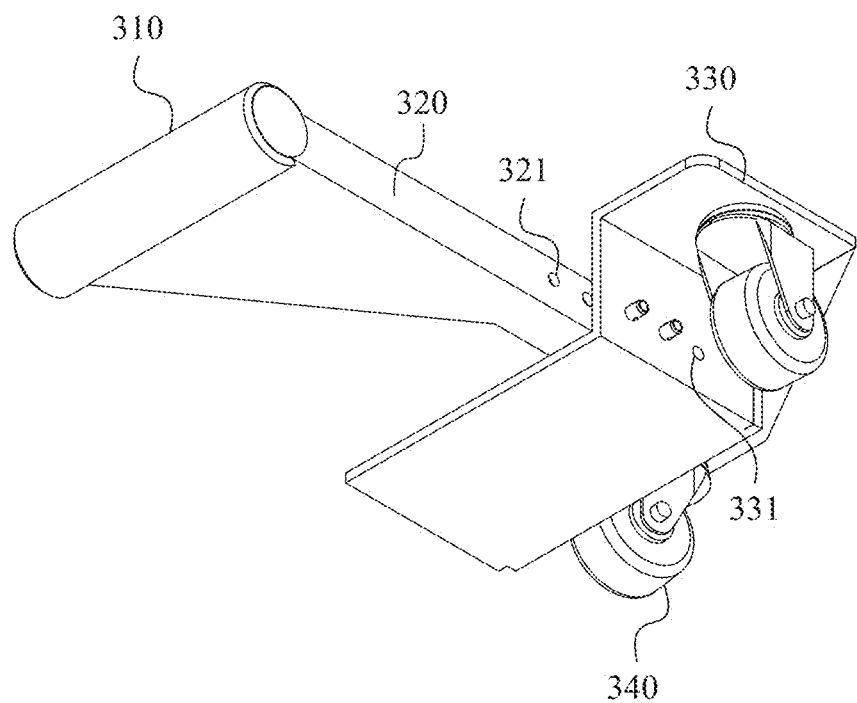
FIG. 12 depicts another perspective view of the kickstand assembly of the present invention.

The pedal 241 is configured to be operated by a foot of a user to rotate downward to push down the caster mounting plate 230 and thus the at least one caster wheel 231 such that the motorcycle wheel plate 250 is raised away from the ground surface. In this configuration, as shown in FIG. 7, the at least one caster wheel 231 is preferably brought into a position where the at least one caster wheel 231 is perpendicular to the ground surface. Therefore, the at least one caster wheel 231 of the at least one motorcycle wheel support assembly 200 carries the whole weight of the motorcycle dolly of the present invention, and a user can easily move around the motorcycle dolly. The pedal 241 is further configured to be rotated upward to allow the caster mounting plate 230 to be lifted such that the motorcycle wheel plate 250 is lowered down onto the ground surface. In this configuration, as shown in FIG. 3, instead of the at least one caster wheel 231, the motorcycle wheel plate 250 carries the weight of the motorcycle dolly of the present invention, and the motorcycle dolly is prevented from being moved around.

In one embodiment, the caster subassembly 210 comprises a sleeve 211 into which the rod 100 can be inserted. The sleeve 211 of the caster subassembly 210 comprises a plurality of position adjustment holes 213, and each rod 100 comprises a caster subassembly hole 103. The sleeve 211 of the caster subassembly 210 further comprises a fastener 215 that is inserted through one of the position adjustment holes 213 and the caster subassembly hole 203 so as to secure the caster subassembly 210 in position. Preferably, the fastener 215 may be a pin. In this way, the longitudinal position of the pair of caster subassemblies 210 and thereby the motorcycle wheel plate 250 can be changed. In one embodiment, the caster bracket 220 comprises two gusset plates 223 that extend from the sleeve 211.

In a typical embodiment, the at least one motorcycle wheel support assembly 200 comprises a first motorcycle wheel support assembly attaching to the first end 101 of the rods and a second motorcycle wheel support assembly attaching to the second end 102 of the rods.

In a preferred embodiment, the present invention further comprises at least one kickstand assembly 300. The at least one kickstand assembly 300 is configured to support a kickstand of the motorcycle. The kickstand assembly 300 comprises a sleeve 310, a kickstand bracket 320 extending from the sleeve 310, and a kickstand pad 330 attached to a distal end of the kickstand bracket 320. The sleeve 310 of the kickstand assembly 300 comprises at least one positioning hole 311, and the rod 100 comprises a plurality of kickstand position adjustment holes 105. The sleeve 310 of the kickstand assembly 300 further comprises at least one fastener 313 configured to secure the kickstand bracket 320 in a desired longitudinal position on the rod 100. The kickstand bracket 320 further comprises at the distal end a plurality of transverse position adjustment holes 321, and the kickstand pad 330 comprises at least one mounting hole 331. The kickstand pad 330 further comprises at least one fastener 332 configured to secure the kickstand pad 330 in a desired transverse position relative to the rod 100. In one embodiment, the at least one fastener 332 of the kickstand pad 330 and the at least one fastener 313 of the sleeve 310 of the kickstand assembly 300 are pins. In one embodiment, the kickstand pad 330 further comprises at least one kickstand caster wheel 340 to assist in the movement of the dolly. In one embodiment, the at least one kickstand caster wheel 340 comprises at least one swivel caster wheel. In one embodiment, the at least one kickstand assembly 300 comprises one kickstand assembly 300 on either side of the platform. With the kickstand assembly 300 being provided on either side of the platform and the beveled edge 254 of the motorcycle wheel support assemblies 200, the present invention allows motorcycles to ride onto and off the present invention with ease from either direction.

It is envisioned that the sizes of the components forming the present invention such as the rods, the motorcycle wheel support assembly, and/or the kickstand assembly can vary based on design requirements. In addition, the present invention can be Although the disclosure has been explained in relation to its preferred embodiment, it is to be understood that many other possible modifications and variations can be made without departing from the spirit and scope of the disclosure.

What is claimed is:
1. A low-profile motorcycle dolly comprising:
a pair of parallel rods each having a first end and a second end;
at least one motorcycle wheel support assembly;
the at least one motorcycle wheel support assembly comprising a pair of caster subassemblies and a motorcycle wheel plate;
each caster subassembly attaching to one of the rods respectively;
each caster subassembly comprising a caster bracket that extends transversely to a respective rod;
the caster bracket at a proximal end attaching to the respective rod and at a distal end being provided with a pedal assembly;
the motorcycle wheel plate being connected between the caster brackets of the pair of caster subassemblies and configured to support a wheel of a motorcycle;
the pedal assembly comprising a pedal and a pedal shaft;
each caster subassembly further comprising a caster mounting plate pivotably mounted onto the caster bracket;

the caster mounting plate comprising at least one caster wheel;

the pedal being configured to be operated by a foot of a user to rotate downward to push down the caster mounting plate such that the motorcycle wheel plate is raised away from a ground surface, and upward to allow the caster mounting plate to be lifted such that the motorcycle wheel plate is lowered down onto the ground surface.

2. The low-profile motorcycle dolly as claimed in claim 1, wherein the at least one motorcycle wheel support assembly comprises a first motorcycle wheel support assembly attaching to the first end of the pair of rods and a second motorcycle wheel support assembly attaching to the second end of the pair of rods.

3. The low-profile motorcycle dolly as claimed in claim 1, wherein each caster subassembly comprises a sleeve into which one of the rods can be inserted.

4. The low-profile motorcycle dolly as claimed in claim 3, wherein the sleeve of each caster subassembly comprises a plurality of position adjustment holes, and each of the pair of rods comprises a caster subassembly hole, and wherein the sleeve of each caster subassembly further comprises a fastener that is inserted through one of the position adjustment holes and the caster subassembly hole.

5. The low-profile motorcycle dolly as claimed in claim 4, wherein the caster bracket comprises two gusset plates that extend from the sleeve.

6. The low-profile motorcycle dolly as claimed in claim 1, wherein the pedal comprises a cam portion adjacent to the pedal shaft.

7. The low-profile motorcycle dolly as claimed in claim 6, wherein the caster mounting plate comprises a concave portion to accommodate the distal end of the caster bracket.

8. The low-profile motorcycle dolly as claimed in claim 1, wherein the motorcycle wheel plate comprises an anti-skid pad at a bottom surface of the motorcycle wheel plate.

9. The low-profile motorcycle dolly as claimed in claim 8, wherein the motorcycle wheel plate comprises at least one beveled edge.

10. The low-profile motorcycle dolly as claimed in claim 1, further comprising at least one kickstand assembly configured to support a kickstand of the motorcycle.

11. The low-profile motorcycle dolly as claimed in claim 10, wherein the at least one kickstand assembly comprises a sleeve, a kickstand bracket extending from the sleeve, and a kickstand pad attached to a distal end of the kickstand bracket.

12. The low-profile motorcycle dolly as claimed in claim 11, wherein the sleeve of the at least one kickstand assembly comprises at least one positioning hole, and one of the rods comprises a plurality of kickstand position adjustment holes, and wherein the sleeve of the at least one kickstand assembly further comprises at least one fastener configured to secure the kickstand bracket in a desired longitudinal position on the one of the rods.

13. The low-profile motorcycle dolly as claimed in claim 12, wherein the kickstand bracket further comprises at the distal end a plurality of transverse position adjustment holes, and the kickstand pad comprises at least one mounting hole, and wherein the kickstand pad further comprises at least one fastener configured to secure the kickstand pad in a desired transverse position relative to the one of the rods.

14. The low-profile motorcycle dolly as claimed in claim 11, wherein the at least one kickstand pad further comprises at least one kickstand caster wheel.

\* \* \* \* \*